United States Patent [19]

Sverdlin

[11] Patent Number: 4,609,312

[45] Date of Patent: Sep. 2, 1986

[54] APPARATUS FOR IN-SITU CRANKSHAFT RECONDITIONING

[76] Inventor: Anatoly Sverdlin, 2018 Willow Wisp, Seabrook, Tex. 77586

[21] Appl. No.: 671,635

[22] Filed: Nov. 15, 1984

[51] Int. Cl.$^4$ .............................................. B23C 1/00
[52] U.S. Cl. .................................. 409/132; 409/199; 51/120; 269/287
[58] Field of Search ............... 409/191, 199, 200, 185, 409/131, 132; 29/6; 51/90, 120; 269/287

[56] References Cited

U.S. PATENT DOCUMENTS

| | | | |
|---|---|---|---|
| 4,309,134 | 1/1982 | Schmid | 409/199 X |
| 4,423,990 | 1/1984 | Kodama et al. | 409/199 X |
| 4,494,280 | 1/1985 | Blaimschein | 29/6 |

OTHER PUBLICATIONS

In-Situ Crankshaft Repair, by H. F. de Jonege, *Diesel & Gas Turbine WorldWide*, Apr. 1983.
On-Site Machining Equipment, Nicol & Andrew.
AMPS' Specialized Services, Automated Marine Propulsion Systems, Inc. Brochure, May 1983.

Innovative Crankshaft Reconditioning Technique, Marine Engineering/Log, Sep. 1983.

*Primary Examiner*—James M. Meister
*Assistant Examiner*—John L. Knoble
*Attorney, Agent, or Firm*—Vinson & Elkins

[57] ABSTRACT

An apparatus for in-situ crankshaft reconditioning includes a bracket connectable to the crank webs of crankshafts of a variety of sizes and configurations. The bracket includes a set of adjustably spaced, two contact point corners which are in turn connected to a set of four spaced vertical posts. The elevation of the corners with respect to the posts is adjustable. A pair of axially spaced apart annular rings are slideably connectable to the vertical posts so that their position in a direction transverse to the length of the crankshaft may be adjusted. A pair of orbital wheels are mounted on the annular rings and the precise positioning of the wheels with respect to the rings is manually adjustable through cam members. A mounting bracket carrying a machining head rotates with the wheels. The position of the machining head is adjustable in at least two dimensions with respect to the position of the orbital wheels.

23 Claims, 10 Drawing Figures

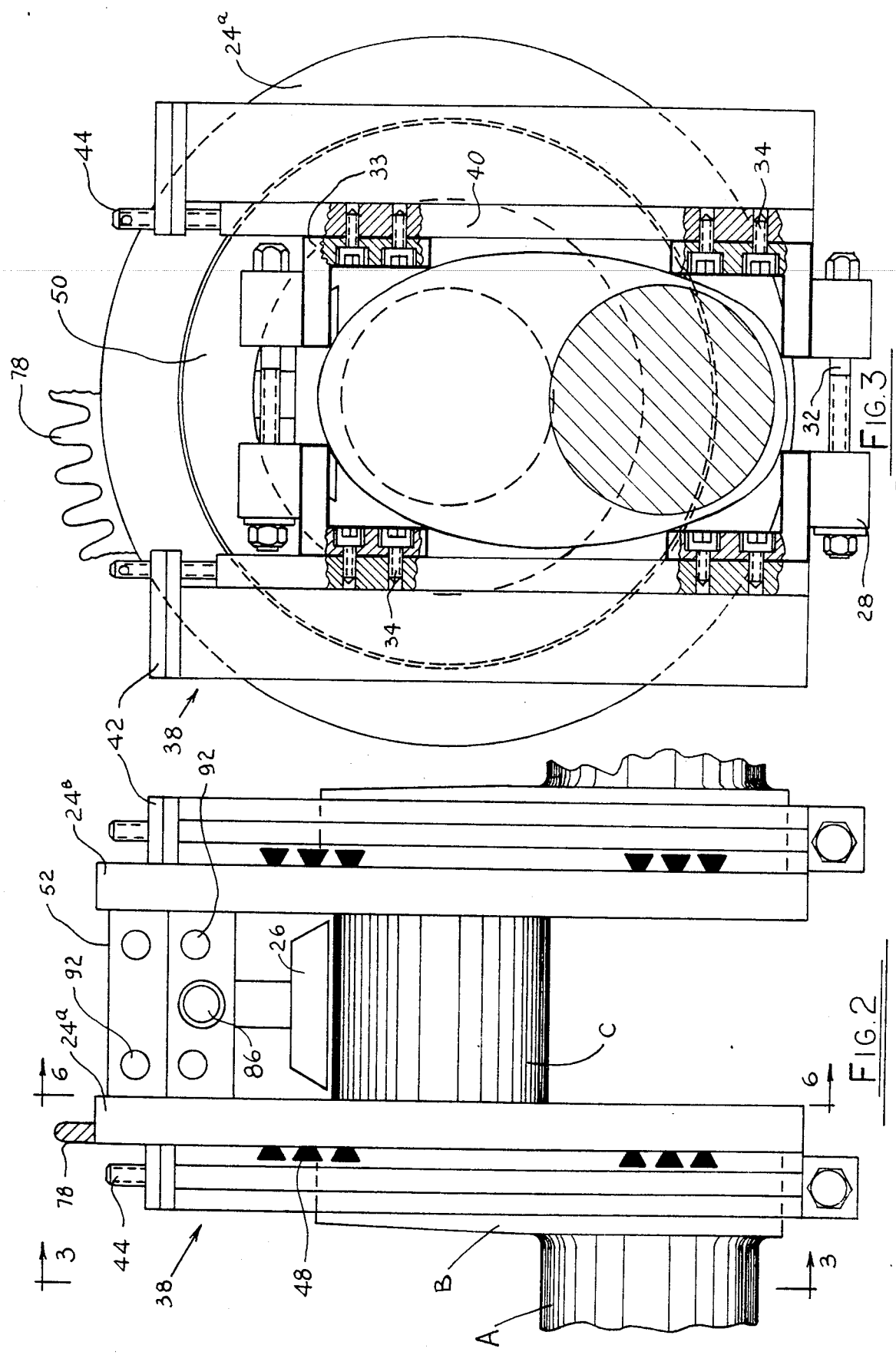

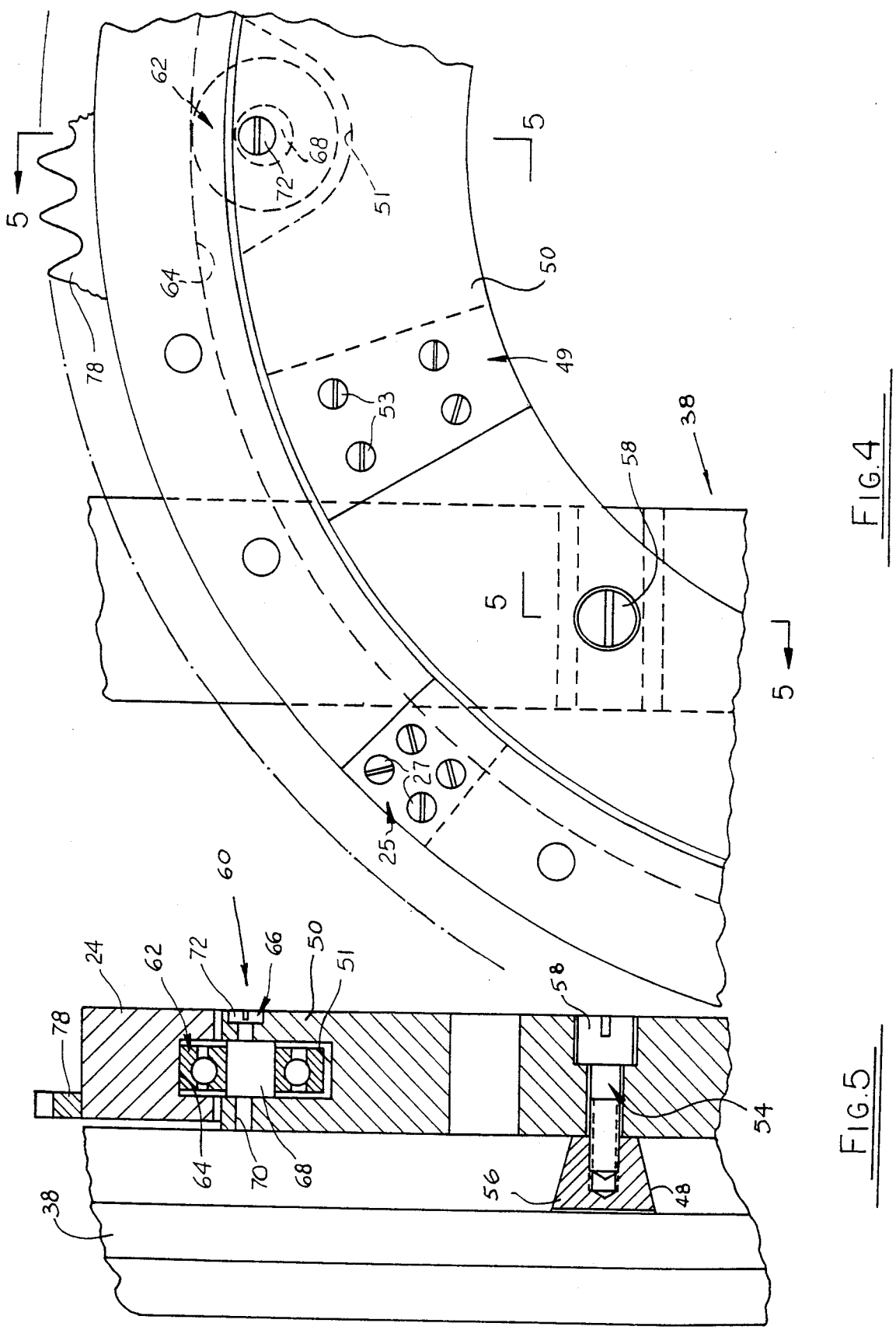

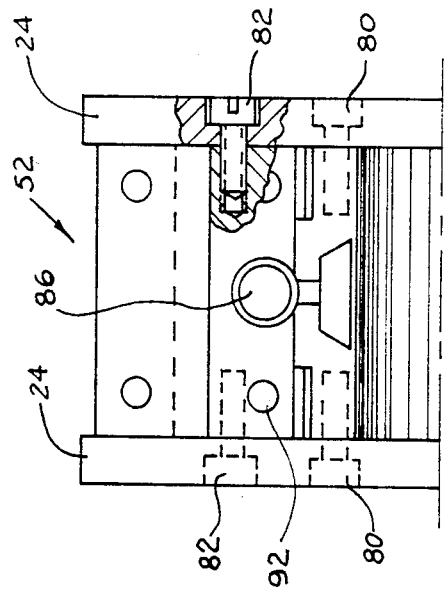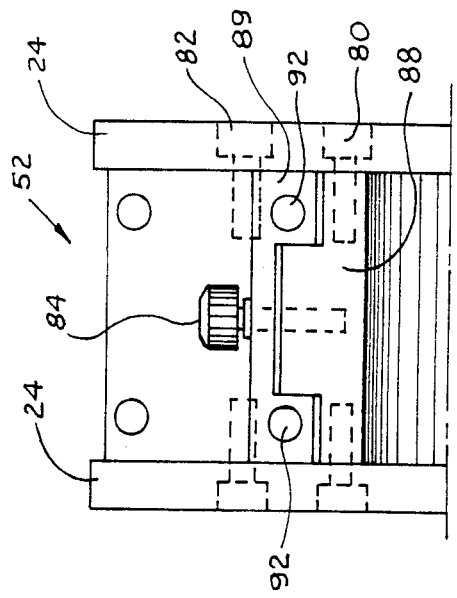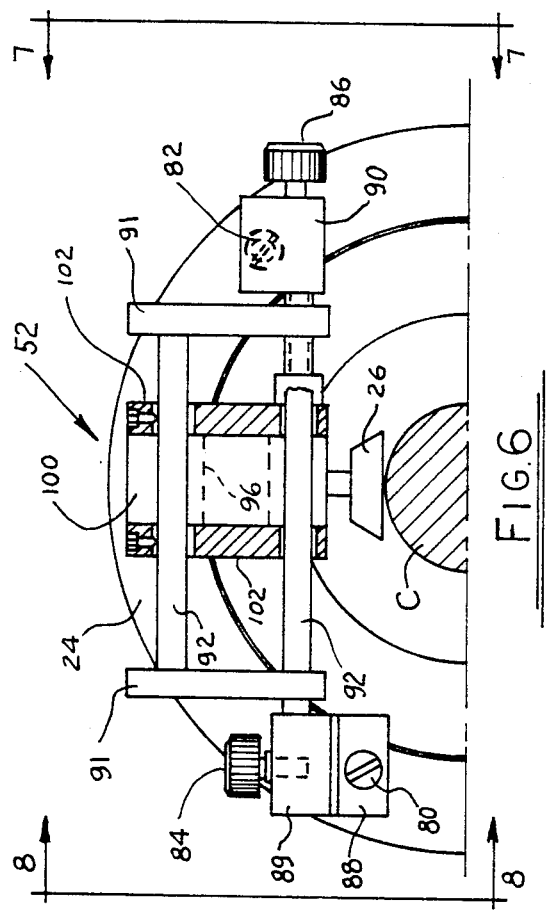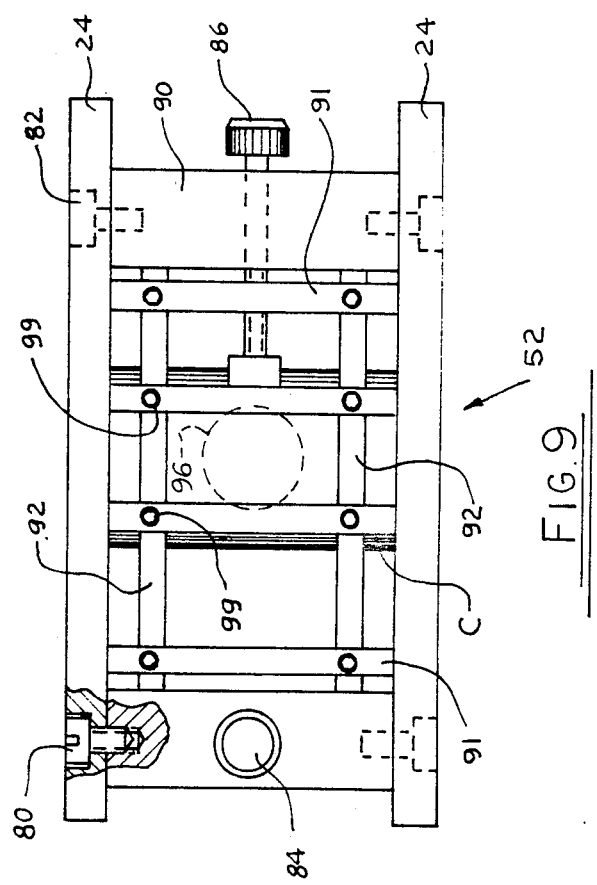

APPARATUS FOR IN-SITU CRANKSHAFT RECONDITIONING

BACKGROUND OF THE INVENTION

1. Field of the Invention

This invention relates generally to equipment for in-situ machining and particularly to orbital machining apparatus for repairing crankshafts.

2. Brief Description of the Background Art

It has been appreciated that while the cost to transport repair personnel to the site of the breakdown of a large scale internal combustion engine, such as a large marine diesel engine, may be high, it is only a fraction of the cost of dismantling a crankshaft, having it transported to a workshop, returning the crankshaft, and reassembling it. H. F. de Jonge, "In Situ Crankshaft Repair," *Diesel and Gas Turbine Worldwide*, April 1983. As a result, various apparatus have been developed for the on-site machining of damaged crankshafts and particularly for the repair of the crank pins of those crankshafts. Included in this kind of machinery are the orbital-type machines which attach to the crankshaft and include a machining head which orbits about the damaged part to remachine the part.

With conventional equipment, it may not be possible to accurately machine the fillet between the crank pin and the crank web. This is because the conventional machining equipment attaches to the crank pin in a way that makes the fillet inaccessible. This limits the usefulness of these devices and may require additional, subsequent machining operations.

In addition, with conventional equipment, it is not always possible to accurately position the orbital tooling head with respect to the crank pin being machined. Once the apparatus is positioned or set on the crankshaft, adjustment thereafter is often difficult or impossible.

SUMMARY OF THE INVENTION

It is a primary object of the present invention to provide an apparatus which enables precise machining in-situ of a crankshaft in need of reconditioning.

it is yet another object of the present invention to provide such an apparatus which enables simultaneous machining of the crank pin and the fillet between the crank pin and the crank web.

It is yet another object of the present invention to provide such an apparatus which can connect to the crank webs of crankshafts of a variety of shapes and configurations.

It is still another object of the present invention to provide an apparatus which enables accurate control over the position of the machining tool with respect to the crankshaft.

It is a still further object of the present invention to provide such an apparatus which enables easy repositioning of the orbital tooling head with respect to the crankshaft after the machining apparatus has been attached to the crankshaft.

It is also an object of the present invention to provide such an apparatus which enables selective wear compensation between the orbital wheels and their supports.

These and other objects of the present invention are achieved by an apparatus for in-situ crankshaft reconditioning that includes a bracket with a clamp securable to the crank web of a crankshaft to be reconditioned. Spaced apart, orbital wheels, mounted on the bracket for rotation on annular rings, are arranged to encircle a crankshaft to be reconditioned. A machining tool is supported between the wheels and is rotatable with the wheels. A wheel position adjustment device is arranged to permit adjustment of the position of the wheels with respect to the bracket. The wheel position adjustment device includes a bearing between each ring and wheel. The device also includes at least two eccentric cam elements, each positioned in contact with one of the bearings. The cam elements are arranged to permit adjustment of the spacing between the rings and the wheels.

In accordance with another embodiment of the present invention an apparatus for in-situ crankshaft reconditioning includes a bracket with a clamping mechanism securable to the crank web of a crankshaft to be reconditioned. The mechanism has two pairs of four spaced apart clamping elements, each adapted to contact a crank web at two spaced points. A pair of spaced apart orbital wheels are mounted on the bracket. The wheels are arranged to encircle the crankshaft to be reconditioned. A machining tool, supportable between the wheels, is rotatable with the wheels.

BRIEF DESCRIPTION OF THE DRAWING

FIG. 2 is a partially cut-away, partial front elevational view of the embodiment shown in FIG. 1 in position on a crankshaft;

FIG. 3 is a cross-sectional view taken generally along the line 3—3 in FIG. 2;

FIG. 4 is an enlarged, partial front elevational view of a portion of one of the orbital wheels shown in FIG. 2;

FIG. 5 is a cross-sectional view taken generally along the line 5—5 in FIG. 4;

FIG. 6 is a reduced, partial, cross-sectional view taken generally along the line 6—6 in FIG. 2;

FIG. 7 is a partially broken away cross-sectional view taken generally along the line 7—7 in FIG. 6, with the vertical posts removed;

FIG. 8 is a cross-sectional view taken generally along the line 8—8 in FIG. 6, with the vertical posts removed;

FIG. 9 is a top plan view of the embodiment of the present invention shown in FIG. 2, with the vertical posts removed.

DESCRIPTION OF A PREFERRED EMBODIMENT

Figure 1:
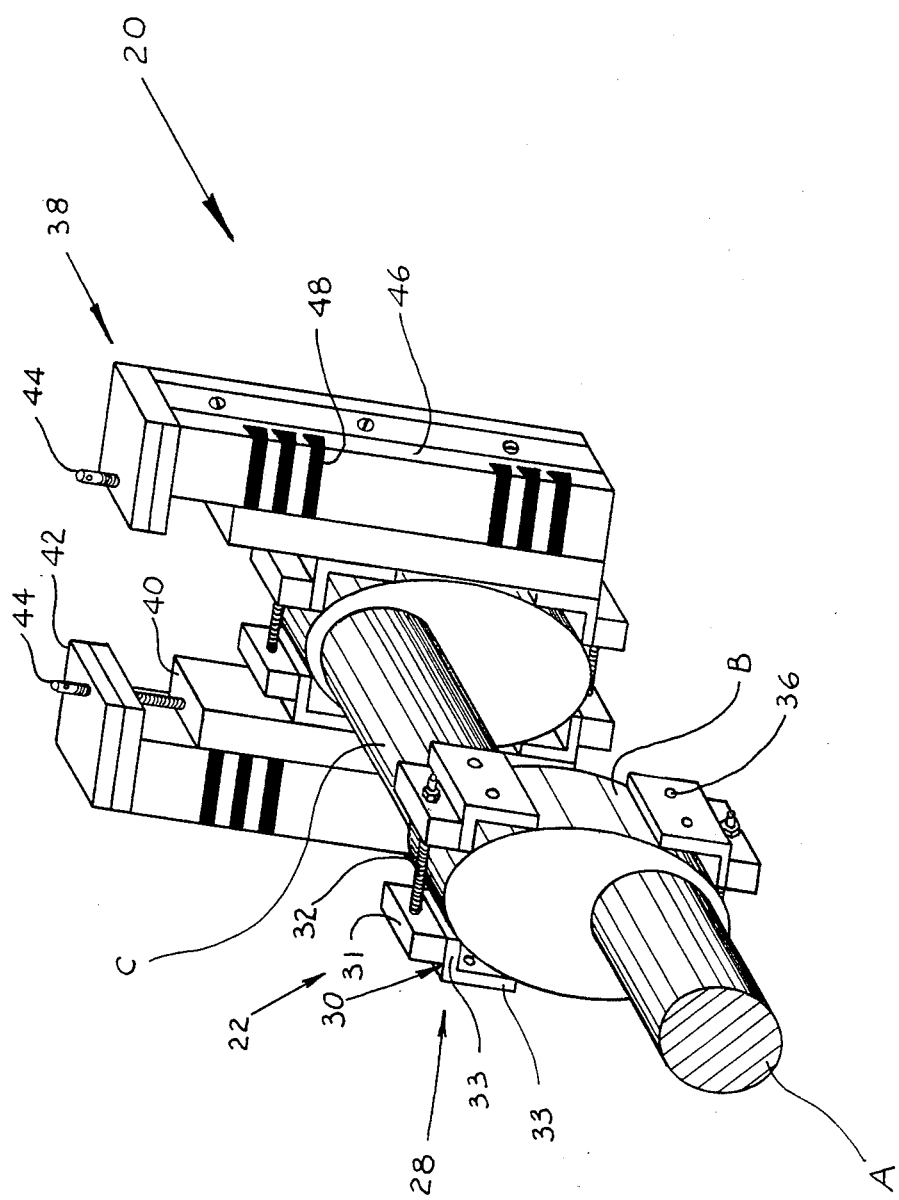
FIG. 1 is a partial perspective view of one embodiment of the present invention in position on a crankshaft to be reconditioned.

Referring to the drawing wherein like reference characters are utilized for like parts throughout the several views, an orbital machining apparatus 20, shown in FIG. 1, includes a bracket 22 for mounting the apparatus 20 on a crankshaft A to be reconditioned. The bracket 22 mounts a pair of orbital wheels 24 (shown in FIGS. 2, 3 and 10 as 24a and 24b) which are axially spaced apart from one another, as shown in FIG. 2. A rotary machining head 26 is mounted for orbital movement about the crankshaft A on the orbital wheels 24.

The bracket 22 clamps to the crank web B on either side of the crank pin C. The bracket 22 includes a pair of crank web clamps 28 that include upper and lower pairs of S-shaped corners 30 connected by threaded fasteners 32. Together each set of four corners 30 define a rectangular clamping surface about each crank web B. The fasteners 32 extend parallel to one side of each corner 30 and through the transverse flanges 31. Each corner 30 includes an angle having a pair of flanges 33 which contact the crank web at two spaced points. Because of the angular, "two contact point" configuration of the corners 30, the bracket 22 is adaptable to clamp crank webs of a variety of configurations, including those that are round, oval, and rectangular. Moreover, because of the ability to adjust the spacing between the corners 30, through the use of threaded fasteners 32, the bracket 22 is adjustable to clamp crank webs of a variety of different sizes.

Vertically juxtaposed pairs of corners 30 are connected by threaded fasteners 34 which extend through holes 36 to adjacent vertical posts 38, as shown in FIG. 3. The crank pin C to be reconditioned is positioned centrally between the vertical posts 38. Each post 38 includes a bar 40 on its inward facing surface, a top plate 42, and a threaded adjustment pin 44. The bar 40 slidably engages the remainder of the post 38 so that the vertical position of the posts 38 with respect to the bars 40 may be adjusted through the adjustment of the threaded pins 44 which extend from the top plate 42. Since the corners 30 are threadedly secured to the bars 40, the elevation of the posts 38 may be adjusted with respect to the corners 30, through the threaded pins 44.

Positioned on the axially inwardly facing sides of the posts 38 are horizontal guide plates 46. Each plate 46 includes two spaced sets of horizontally oriented, dove-tailed grooves 48. The sets of grooves 48 are spaced equally either above or below the position of the crank pin C, and extend transversely to the length of the crankshaft.

As shown in FIGS. 2 and 3, a pair of axially spaced apart inner annular rings 50 are mounted on the vertical posts 38 concentrically with the crank pin C. The orbital wheels 24 form outer rings mounted concentrically on the exterior or peripheral edge of the inner annular rings 50 for rotation about the rings 50 which are fixed against rotation relative to crankshaft A. A machining tool mounting bracket 52 extends between the orbital wheels 24 and carries the machining tool or head 26.

As shown in FIGS. 4 and 5, the inner annular rings 50 connect to the vertical posts 38 by way of dove-tailed pins 54 which engage the dove-tailed grooves 48 in the posts 38. Each dove-tailed pin 54 includes a dove-tail 56 and a threaded fastener 58 extending through the annular ring 50 into the dove-tail 56 which slides within the grooves 48. In this way, the position of each annular ring 50, in a direction transverse to the length of the crankshaft A, may be adjusted and set as desired by the user by first loosening the fasteners 58 to adjust the relative positions and then tightening the fasteners 58 when the desired orientation has been achieved. As mentioned previously, the position of the annular rings 50 along the vertical axis is adjustable through the threaded pins 44.

The relative position of the outer rings or orbital wheels 24 with respect to their respective inner annular rings 50 is adjustable by a plurality of wheel position adjustment devices 60 spaced circumferentially along the interface between each ring 50 and wheel 24 and mounting wheel 24 for rotation on ring 50. Advantageously six or more devices 60 are spaced circumferentially at regular intervals about the ring 50. As shown in FIGS. 2, 4 and 5, each wheel position adjustment device 60 includes an annular bearing 62 located in the annular ring 50 within a depression 51 and extending within an annular groove 64 of wheel 24. An eccentric cam 66, mounted within the bearing 62, in the annular ring 50, includes a cam 68 and a pin 70 extending transversely through a ring 50. By engaging the head 72 of the pin 70, the pin 70 may be rotated to vary the position of the cam 68 about the circumference of the pin 70. Since the cam 68 is eccentric with respect to the pin 70, rotation of the pin 70 varies the extent of radial extension of the bearing 62 from the ring 50 against the surface defined by groove 64 of the wheel 24 over a broad range, in very accurate increments. In the same manner each of the devices 60 may be precisely adjusted to center the wheels 24.

Referring to FIG. 4 each ring 50 and wheel 24 is formed of two split half sections joined at offset joints 49 and 25 respectively by threaded fasteners 53 and 27 respectively. The wheels 24 and rings 50 are radially spaced slightly from one another in areas where a cam 68 is not present.

Figure 10:
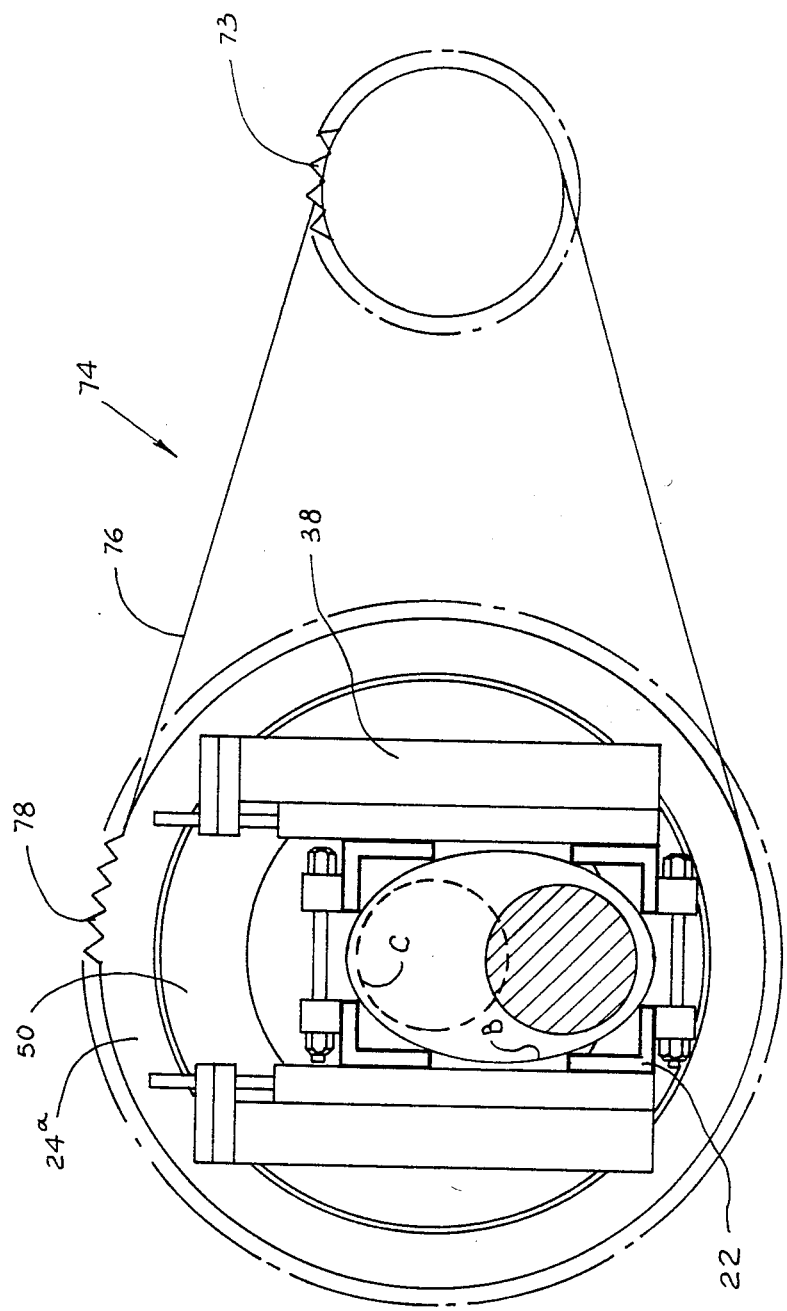
FIG. 10 is a reduced side elevational view of the embodiment of the present invention shown in FIG. 1.

As shown in FIGS. 2 and 10, the wheels 24, connected by the mounting bracket 52, may be rotated with respect to the annular rings 50 through the drive mechanisms 74. The mechanism 74 includes a suitable motor (not shown), a drive chain 76, a drive gear 73 and the toothed exterior surface 78 of the orbital wheel 24a. In response to rotation of the orbital wheel 24a, the wheel 24b is driven at the same speed due to the interconnection between the wheels 24. This results in rotation of the wheels 24, mounting bracket 52, and machining head 26 in a concentric circular arc about the crank pin C.

The mounting bracket 52 enables precise positioning of the machining head 26 with respect to the crank pin C, as shown in FIGS. 6-9. Specifically, the bracket 52 connects to the orbital wheels 24 through the screws 80 and 82. The position of the bracket 52 may be adjusted vertically through the threaded pin 84. The horizontal orientation of the bracket 52 may be varied by adjusting the extension of the threaded pin 86 with respect to the block 90. Adjustment of the pin 84 results in pivoting motion about the axis of the crank pin C through the separation of the interleaved portions 88, 89, as shown in FIGS. 6 and 8.

Extension of the threaded pin 86 with respect to the strut 91 results in sliding movement of the assembly 100 along the pair of spaced bars 92, as shown in FIGS. 6 and 9, when the threaded fasteners 99 are loose. The assembly 100 includes a pair of upper, transversely oriented plates 102 and the motor 96. The plates 102 are journalled on the bars 92. Thus, when the fasteners 99 are loosened, the assembly 100 may be repositioned and then fixed in place by the fasteners 99.

The motor 96 rotates the head 26 about an axis radially aligned with the crank pin C. While the machining head 26 is illustrated as being disc-shaped and having an upwardly tapering trapezoidal cross-sectional configuration, a variety of other shapes may be utilized as well. For example, the edges of the machining head 26 may be blunted in order to appropriately shape the fillet between a crank pin and a crank web.

The portable machining apparatus 20 may be utilized in generally the following fashion. Initially the engine bedplate (not shown) is broken down and the crankshaft may be removed and positioned on suitable supports (not shown). However, it is not necessary to remove the crankshaft. Thus, if the crankshaft may not be removed easily or practically, the apparatus 20 may be assembled about the crankshaft in position within the bedplate.

The apparatus 20 is then attached to the crankshaft A at the position of the crank pin which needs machining. The clamps 28 are positioned about the crank webs adjacent the crank pin to be refinished. Pairs of corners 30, connected by threaded fasteners 32, are adjusted to fit to the size of the particular crank web. Since the corners 30 are angular and provide two points of contact, the clamps 28 may be utilized in connection with a variety of shapes and sizes of crankshafts. When the clamps 28 have been adjusted to the required size, each clamp is threadedly secured to a verticl post 38 by way of fasteners 34 which extend through the holes 36 in the corners 30. With the clamps 28 secured to the bars 40, the position of the bars 40 with respect to the posts 38 or vice versa may be set by appropriate adjustments to the threaded pins 44.

The annular rings 50 are assembled about the crank pin C by securing the two sections of each ring 50 together around the crankpin C and then fastening the screws 53. The rings 50 are then mounted on the vertical posts 38 by threading the threaded fasteners 58 through the annular rings 52 to connect to the dovetails 56 situated within the dovetailed grooves 48. Before the threaded fasteners 58 are completely tightened the positions of the annular rings 50 with respect to the vertical posts 38 are subject to horizontal adjustment. Once the desired orientation and relative position has been attained, the threaded fasteners 58 may be secured tightly in position to set the desired horizontal position of the annular rings 50.

The wheels 24 are secured in concentric relation about the rings 50 by clamping the two wheel sections together using the screws 27. Next, the position of the orbital wheels 24 may be adjusted with respect to the annular rings 50. This supplementary adjustment enables very fine positioning of the orbital wheels 24 with respect to the crank pin C. Each of the wheel position adjustment devices 60 is appropriately adjusted to insure a very accurate and smooth rotation of the orbital wheels 24 on the annular rings 50. In this way, regardless of the wear between the orbital wheels 24 and the annular rings 50, the orbital wheels 24 may always be adjusted with respect to the rings 50 to achieve accurate and smooth relative rotation. Adjustment may be made by rotating the eccentric cams 66 to vary the spacing between the wheels 24 and rings 50, thereby achieving smooth wheel rotation.

Subsequently, the position of the machining head 26 with respect to the crank pin C may be adjusted. Initially the spacing between the machining head 26 and the crank pin C is adjusted by rotating the threaded pin 84, after loosening the screws 82. This pivots the entire mounting bracket 52 about the crank pin C around the pivot created by the screws 82. The screw 82 are then tightened to secure the head 26 in position.

Thereafter the position of the machining head 26 with respect to the crank pin C in a direction transverse to the length of the crankshaft A is adjusted by loosening the screws 99 and rotating the threaded pin 86. This rotation pushes the motor 96 and assembly 100 along the bars 92 to the desired position.

When the apparatus 20 is turned "on", the motor 96 rotates the machining head 26 about an axis extending radially away from the crank pin C. The selected machining head 26 conforms to the desired cross-sectional shape of the crank pin being machined and may have a diameter equal to the spacing between adjacent crank webs. In addition, the orbital wheel 24 is rotated by the drive mechanism 74 and the engagement of the chain 76 with the peripheral teeth 78. The rotation of the wheel 24a drives the wheel 24b and the connecting mounting bracket 52. This rotates the machining head 26 about the external surface of the crank pin C while rotating about a radial axis generally perpendicular to the surface of the crank pin C. In this way the entire peripheral surface of the crank pin C is accurately machined. It is also possible to machine the fillet areas between the crank pin and the crank web by using a machining head 26 with fillet shaped edges.

With the present invention, it is possible to accurately machine a crankshaft because a number of adjustments are possible between the machining head 26 and the surrounding apparatus 20. Moreover the relative positions between the orbital wheel 24 and the annular ring 50 may be accurately adjusted so that regardless of wear between these two elements, accurate and smooth rotation may always be achieved. Not only is the apparatus 20 accurately adjustable with respect to a given crankshaft, it is adaptable to crankshafts of a variety of sizes and shapes. The clamps 28 allow the apparatus 20 to secure to the crank web of essentially any crankshaft. The simple operation of the clamps 28 enables easy assembly of the machining apparatus 20 about a part to be machined.

The position of the orbital wheels 24 may be accurately adjusted in three dimensions. Moreover the positioning of the orbital wheels 24 may be precisely adjusted after the apparatus 20 is in position about a crankshaft to be machined. Even after the orbital wheels 24 have been fixed in a desired position, the desired position of the machining head 26 may be still more closely adjusted. This is because the machining head 26 is also adjustable in position in at least two dimensions with respect to the orbital wheels 24. The ability to finely adjust the position of the machining head 26 in a number of successive steps enables very accurate and very easy adjustment of the position of the machining head 26 with respect to the crank pin.

While the present invention has been described with respect to a single preferred embodiment, those skilled in the art will appreciate a number of modifications and variations therefrom and it is intended within the appended claims to cover all such modifications and variations that fall within the true spirit and scope of the present invention.

What is claimed is:

1. An apparatus for in-situ crankshaft reconditioning comprising:
   a bracket including a clamping mechanism securable to the crank webs of a crankshaft to be reconditioned, said mechanism including two pairs of four spaced apart clamping elements, each adapted to contact a crank web at two spaced points;
   a pair of spaced apart orbital wheels mounted on said bracket and arranged to encircle a crankshaft to be reconditioned; and
   a machining tool supportable between said wheels and rotatable with said wheels.

2. The apparatus of claim 1 wherein said clamping elements are L-shaped and are oriented with respect to one another so as to define a rectangular clamping surface about said crank web.

3. The apparatus of claim 2 wherein said clamping elements are connected in pairs by threaded fasteners so that the spacing between each element of pair may be adjusted, said bracket further including a set of four spaced apart vertical posts, said elements being removably connected to said posts.

4. The apparatus of claim 3 wherein said bracket supports a pair of spaced apart annular split rings, each ring mounting one of said orbital split wheels, a bearing being positioned between each wheel and ring, said apparatus further including at least two eccentric cams, one for each wheel, said cams positioned to radially bias each of said bearings against one of said wheels, said cams arranged to permit manual adjustment of spacing between said wheels and said rings.

5. An apparatus for in-situ crankshaft reconditioning comprising:
  a bracket including a clamping mechanism securable to the crank web of a crankshaft to be reconditioned and having four spaced apart elements each adapted to contact said crank web at two spaced points, said bracket further including a pair of annular rings;
  a pair of spaced apart orbital wheels mounted for rotation on said annular rings and arranged to encircle a crankshaft to be reconditioned;
  a machining tool supportable between said wheels and rotatable with said wheels; and
  a wheel position adjustment device arranged to permit adjustment of the position of said wheels with respect to said rings, said wheel position adjustment device including a bearing between each ring and wheel, said device further including at least two eccentric cam elements, each positioned in contact with one of said bearings, said cam elements arranged to permit adjustment of the spacing between said rings and said wheels.

6. The apparatus of claim 1 wherein said spaced apart elements are adjustably connected together in pairs.

7. An apparatus for in-situ crankshaft reconditioning comprising:
  a bracket including a clamping mechanism securable to the crank web of a crankshaft to be reconditioned, and having four pairs of angular members, each pair connected by threaded fasteners so that the spacing between each angular member of a pair may be adjusted, said bracket further including a pair of annular rings; a pair of spaced apart orbital wheels mounted for rotation on said annular rings and arranged to encircle a crankshaft to be reconditioned;
  a machining tool supportable between said wheels and rotatable with said wheels; and
  a wheel position adjustment device arranged to permit adjustment of the position of said wheels with respect to said rings, said wheel position adjustment device including a bearing between each ring and wheel, said device further including at least two eccentric cam elements, each positioned in contact with one of said bearings, said cam elements arranged to permit adjustment of the spacing between said rings and said wheels.

8. The apparatus of claim 7 wherein said bracket further includes a set of four vertical posts, said angular members being removably connectable to said posts.

9. The apparatus of claim 1 wherein the elevation of said clamping mechanism with respect to said posts is manually adjustable.

10. The apparatus of claim 8 wherein said annular rings are removably securable to said posts, said rings being slideably connected to said posts to permit adjustment of the position of said rings with respect to said posts in a direction transverse to the length of a crankshaft to be reconditioned.

11. The apparatus of claim 10 wherein said sliding connection of said rings to said posts is a dovetailed connection.

12. A portable apparatus for machining a crank pin between a pair of crank webs of a crankshaft adapted to be removably positioned about the crankshaft from a direction transversely of the longitudinal axis of the crankshaft and without any portion thereof positioned beyond the ends of said crankshaft; said portable apparatus comprising:
  securing means for removably mounting the portable apparatus onto the pair of crank webs adjacent the ends of the crank pin to be machined and wholly supporting the portable apparatus thereon, said securing means including a support tightly fitting on each of the pair of crank webs to define a pair of axially spaced fixed supports spanning the crank pin between the crank webs;
  a rotatable support for the machining tool mounted on the fixed supports for rotation about the crankshaft and spanning the crank pin to be machined;
  a machining tool carried by said rotatable support and adapted to engage the crank pin in a machining operation; and
  means to rotate said rotatable support and machining tool thereon about said crank pin for machining the entire crank pin between said pair of crank webs including the radii at the junctures of the crank pin with the adjacent crank webs.

13. A portable machining apparatus for machining a crank pin between crank webs of a crankshaft adapted to be removably positioned about the crankshaft from a direction transversely of the longitudinal axis of the crankshaft and without any portion thereof positioned beyond the end of said crankshaft; said portable apparatus comprising:
  securing means for removably mounting the portable apparatus onto the pair of crank webs adjacent the ends of the crank pin to be machined and spanning the crank pin therebetween, said securing means including an inner support ring mounted on each crank web to define a pair of axially spaced generally parallel fixed inner support rings on said crank webs;
  a rotatable support for the machining tool including a pair of outer concentric rings mounted on the pair of inner support rings for rotation thereabout and spanning the crank pin to be machined;
  a machining tool carried by said outer concentric rings and adapted to engage the crank pin in a machining operation; and
  means to rotate said rotatable support and machining tool thereon about said crank pin for machining the entire crank pin between said pair of crank webs including the radii at the junctures of the crank pin with the adjacent crank webs.

14. A portable machining apparatus as set forth in claim 13 wherein adjusting means are provided on said rotatable support to adjust said machining tool radially and transversely with respect to the crank pin being machined.

15. A portable machining apparatus as set forth in claim 13 wherein adjustable bearing means are mounted between said inner and outer concentric rings and support said outer rings for rotation about said inner rings, said bearing means being adjustable to compensate for wear thereof.

16. A portable machining apparatus as set forth in claim 15 wherein said bearing means comprises a plurality of eccentric bearings carried by said inner rings and spaced circumferentially about said inner rings.

17. A portable machining apparatus as set forth in claim 13 wherein said inner and outer concentric rings are split for removably fitting around the crankshaft.

18. A portable machining apparatus for machining a rotary shaft adapted to be removably positioned about the shaft from a direction transversely of the longitudinal axis thereof and without any portion thereof positioned beyond the ends of said shaft; said portable apparatus comprising:

securing means mounted on and removably secured to the shaft and including a pair of axially spaced support rings spanning therebetween a portion of the shaft to be machined;

a rotatable support for the machining tool including a pair of outer concentric rings mounted on the pair of inner support rings for rotation thereabout, a plurality of adjustable bearings mounted between said inner and outer concentric rings and spaced about the outer circumference of said inner rings to support said outer rings for rotation thereon;

a machining tool carried by said outer concentric rings and adapted to engage the shaft portion in a machining operation;

means to adjust the position of said machining tool relative to said rotatable support and the shaft portion to be machined; and means to rotate said rotatable support and machining tool thereon about said shaft portion for machining thereof.

19. A portable machining apparatus as set forth in claim 18 wherein said bearings are eccentric bearings, each being adjustable to compensate for wear thereof while maintaining said outer concentric rings in accurately aligned position.

20. A portable machining apparatus as set forth in claim 18 wherein said inner and outer concentric rings are split for attachment about and detachment from said shaft.

21. A method of removably positioning a portable machining apparatus onto a pair of adjacent crank webs on a crankshaft to be reconditioned from a direction transversely of the longitudinal axis of said crankshaft, and then machining a crank pin between the crank webs by rotating a machining tool about the crank pin; said method includes the steps of:

first securing a removable support on each crank web of said pair from a direction transversely of the longitudinal axis of the crankshaft with the removable supports spanning the crank pin between the crank webs;

then positioning a rotatable support on the spaced fixed supports for rotation about the crankshaft and spanning the crank pin to be machined, a machining tool being mounted on the rotatable support for engaging in a machining operation the entire length of the crank pin between the crank webs including the radii at the ends of the crank pin;

adjusting the position of the machining tool on the rotatable support relative to the crank pin; and rotating the rotatable support and machining tool thereon about the removable supports and the crankshaft for machining of the crank pin.

22. A method of removably positioning a portable machining apparatus onto a pair of adjacent crank webs on a crankshaft to be reconditioned from a direction transversely of the longitudinal axis of said crankshaft, and then machining a crank pin between the crank webs by rotating a machining tool about the crank pin; said method including the steps of:

first clamping a support onto each crank web from a direction transversely of the longitudinal axis of the crankshaft;

then mounting an inner ring onto the clamped support at each crank web about the adjacent crank web;

then mounting an outer concentric ring about each inner ring with bearings therebetween for rotation of the outer rings about the inner rings, a machining tool being mounted on the outer rings for engaging in a machining operation the entire length of the crank pin between the outer rings and the crank webs including the radii at the ends of the crank pin; and rotating the outer rings and machining tool thereon about the inner rings and the crankshaft for machining the crank pin between the crank webs.

23. A method of removably positioning a portable machining apparatus onto a pair of adjacent crank webs on a crankshaft to be reconditioned from a direction transversely of the longitudinal axis of said crankshaft, and then machining a crank pin between the crank webs by rotating a machining tool about the crank pin; said method including the steps of:

first clamping a removable support member onto each crank web from a direction transversely of the longitudinal axis of the crankshaft;

next mounting an inner ring alongside each of the removable support members adjacent the crank pin to be machined and about the adjacent crank web;

adjusting the position of the inner rings relative to the associated support members;

then positioning an outer concentric ring about each inner ring with adjustable bearings therebetween mounting the outer rings for rotation about the inner rings and the crankshaft, a machining tool being mounted on the outer ring for engaging in a machining operation the entire length of the crank pin between the outer rings and crank webs including the radii at the ends of the crank pin;

adjusting the position of the machining tool on the outer rings in directions radially and transversely of the crank pin; and rotating the rotatable support and machining tool thereon about the inner rings and the crankshaft for machining of the crank pin.

* * * * *